United States Patent
Pesaranghader et al.

(10) Patent No.: US 12,541,786 B2
(45) Date of Patent: Feb. 3, 2026

(54) ARTIFICIAL INTELLIGENCE DEVICE FOR MULTI-MODAL RECOMMENDER AND CONTROL METHOD THEREOF

(71) Applicant: LG ELECTRONICS INC., Seoul (KR)

(72) Inventors: Ali Pesaranghader, Toronto (CA); Touqir Sajed, Toronto (CA)

(73) Assignee: LG ELECTRONICS INC., Seoul (KR)

( * ) Notice: Subject to any disclaimer, the term of this patent is extended or adjusted under 35 U.S.C. 154(b) by 217 days.

(21) Appl. No.: 18/535,906

(22) Filed: Dec. 11, 2023

(65) Prior Publication Data

US 2024/0193667 A1 Jun. 13, 2024

Related U.S. Application Data

(60) Provisional application No. 63/431,653, filed on Dec. 9, 2022.

(51) Int. Cl.
*G06Q 30/00* (2023.01)
*G06F 40/40* (2020.01)
*G06Q 30/0601* (2023.01)

(52) U.S. Cl.
CPC ......... *G06Q 30/0631* (2013.01); *G06F 40/40* (2020.01)

(58) Field of Classification Search
None
See application file for complete search history.

(56) References Cited

U.S. PATENT DOCUMENTS

| | | | |
|---|---|---|---|
| 2017/0168690 A1* | 6/2017 | Kirk | G06F 16/24578 |
| 2019/0205964 A1 | 7/2019 | Rubio et al. | |
| 2021/0004421 A1* | 1/2021 | Zadorojniy | G06F 16/9536 |
| 2022/0179910 A1* | 6/2022 | Bharathy | G06F 16/9024 |
| 2023/0100788 A1* | 3/2023 | Zatorski | G06Q 30/0631 |
| | | | 706/20 |

FOREIGN PATENT DOCUMENTS

| | | |
|---|---|---|
| CN | 110298770 A | 10/2019 |
| CN | 113722430 A | 11/2021 |
| JP | 6829240 B2 | 2/2021 |

\* cited by examiner

*Primary Examiner* — Mila Airapetian
(74) *Attorney, Agent, or Firm* — Birch, Stewart, Kolasch & Birch, LLP

(57) ABSTRACT

A method for controlling an artificial intelligence (AI) device can include receiving, via a processor in the AI device, a request for a recommendation, determining, via the processor, a selected recommender from among a behavior-based recommender, a review-based recommender and an image-based recommender based on at least one of a modality of the request, a format of the request and a content of the request, and transmitting, via the processor, the request to the selected recommender. The method can further include generating, via the processor, recommendation results based on knowledge graph embeddings corresponding to the selected recommender, and outputting, via an output unit in the AI device, the recommendation results.

20 Claims, 12 Drawing Sheets

ARTIFICIAL INTELLIGENCE DEVICE FOR MULTI-MODAL RECOMMENDER AND CONTROL METHOD THEREOF

CROSS-REFERENCE TO RELATED APPLICATIONS

This non-provisional application claims priority under 35 U.S.C. § 119(e) to U.S. Provisional Application No. 63/431,653, filed on Dec. 9, 2022, the entirety of which is hereby expressly incorporated by reference into the present application.

BACKGROUND

Field

The present disclosure relates to a multi-modal, multi-purpose recommender device and method, in the field of artificial intelligence (AI). Particularly, the method can provide a multi-modal and multi-purpose recommender for behavior-based recommendations, review-based recommendation and image-based recommendations, in the AI field.

Discussion of the Related Art

Recommender systems have gained significant traction in recent years, driven by the growing need to automate the process of catering to user preferences. These systems have revolutionized the way people receive recommendations, facilitating the promotion of various items, such as movies, books, and restaurants, to clients of a business or online platform.

However, other categories of items (e.g., food recipes, etc.) have not received much attention with regards to recommendation systems, even though there exists a large amount of available data and resources for these other categories. Also, certain categories of items (e.g., food recipes, food preferences, a category where a user may have very disparate interests and varying tastes) provide unique issues that often confuse recommendation systems making it difficult to provide useful and accurate recommendations.

In addition, recommendation systems often only focus on one modality or one type of approach, e.g., either matching a text-based input query and returning results or searching an input image and returning similar matched image results.

Also, recommendation systems often struggle with the zero-shot (e.g., cold start) problem regarding how to make recommendations to a new user for whom a history of past behaviors and past interactions are not yet available.

Accordingly, there is a need for a recommender that can provide a holistic approach that can handle multi-modalities, multiple recommendation settings, and multi-purposes in a single solution, which can also address zero-shot (e.g., cold start) issues, conditional recommendation issues, improve recommendation accuracy and further improve user convenience.

SUMMARY OF THE DISCLOSURE

The present disclosure has been made in view of the above problems and it is an object of the present disclosure to provide a device and method that can provide a multi-modal, multi-purpose recommender device and method, in the field of artificial intelligence (AI). Further, the method can provide a multi-modal and multi-purpose recommender for behavior-based recommendations, review-based recommendation and image-based recommendations.

It is another object of the present disclosure to provide an artificial intelligence (AI)-device that can implement a recommender that includes a behavior-based recommender, a review-based recommender and an image-based recommender, which is configured to handle different modalities.

An object of the present disclosure is to provide an artificial intelligence (AI) device having a recommender including a behavior-based recommender (BRS), a review-based recommender (RRS) and an image-based recommender (IRS) for providing recommendation results.

An object of the present disclosure is to provide a recommender including a behavior-based recommender (BRS) configured to perform a link prediction task between the person and recipe entities in the graph. Also, the behavior-based recommender can predict whether a user will like a recipe by analyzing the connections in the knowledge graph. According to an embodiment, the behavior-based recommender can perform a zero-shot inference approach and conditional recommendation (CR) based on the clusters of recipes (e.g., topics or categories) that the user may like.

Another object of the present disclosure is to provide a recommender including a review-based recommender (RRS) configured to encode an input query (e.g., "Blackberry ice-cream"), and match it with reviews across all recipes (or items or entities) in the knowledge graph to recommend recipes to the user. Also, the review-based recommender can implement a hybrid approach that aggregates results from two different sources, such as combining results generated by using a pre-trained natural language processing (NLP) embedding model with results generated from a pre-trained knowledge graph embedding (KGE) model, in order to create an aggregated list of results that is more accurate and more relevant to the input request.

An object of the present disclosure is to provide a recommender including an image-based recommender (IRS) configured obtain latent representations of an input image for finding similar recipes or foods (or items, entities). In other words, the image-based recommender can analyze an input image and extracts its key features, and these features are then used to recommend visually similar recipes or foods (or items, entities) to the user. According to an embodiment, the image-based recommender can be guided with knowledge graph embeddings (KGE) to provide more relevant results.

An object of the present disclosure is to provide a method for controlling an artificial intelligence (AI) device that includes receiving, via a processor in the AI device, a request for a recommendation, determining, via the processor, a selected recommender from among a behavior-based recommender, a review-based recommender and an image-based recommender based on at least one of a modality of the request, a format of the request and a content of the request, transmitting, via the processor, the request to the selected recommender, generating, via the processor, recommendation results based on knowledge graph embeddings corresponding to the selected recommender, and outputting, via an output unit in the AI device, the recommendation results.

Another object of the present disclosure is to provide a method in which the recommendation results include a ranked list of items.

Another object of the present disclosure is to provide a method in which the recommendation results include at least one of a food recipe recommendation, a book recommendation, a movie recommendation, a product recommendation, a video recommendation, a news content recommendation, or an advertisement recommendation.

An object of the present disclosure is to provide a method that includes in response to a trigger event occurring, generate the request based on the trigger event, transmitting the request to the behavior-based recommender, using an already added placeholder node to a knowledge graph, the placeholder node corresponding to a user associated with the trigger event, generating a natural language processing (NLP) embedding representation based on user information associated with the user, aligning the NLP embedding representation to a knowledge graph embedding associated with the behavior-based recommender to generate an aligned embedding, and assigning the aligned embedding to a node corresponding to the user, and generating the recommendation results based on the node via link prediction.

Another object of the present disclosure is to provide a method that includes in response to a trigger event occurring, generating the request based on the trigger event, transmitting the request to the behavior-based recommender, decoupling the user node to generate a new set of nodes, the first new node corresponding to a first node cluster and the second new node corresponding to a second node cluster, and so on, and generating the recommendation results for the user based on the new nodes via link prediction.

Yet another object of the present disclosure is to provide a method in which the first node cluster corresponds to a first group of recipes for a first type of cuisine, and the second node cluster corresponds to a second group of recipes for a second type of cuisine different than the first type of cuisine.

Another object of the present disclosure is to provide a method that further includes in response to the request including a textual query, transmitting the request to the review-based recommender, generating a natural language processing (NLP) embedding representation based on the textural query, aligning the NLP embedding with knowledge graph embeddings of reviews to generate an aligned embedding representation for the textural query, and generating the recommendation results for the user based on the aligned representation via link prediction.

An object of the present disclosure is to provide a method in which the recommendation results are hybrid results based on first recommendation results generated based on the knowledge graph embedding model and second recommendation results generated based on the natural language processing (NLP) embedding model.

Another object of the present disclosure is to provide a method that further includes in response to the request including an image, transmitting the request to the image-based recommender, during training, guiding a variational autoencoder based on a knowledge graph embedding space to learn a distribution of images, comparing an encoded representation of the image to representations of images corresponding to the distribution of images to determine similar images that are similar to the image in the request; and generating the recommendation results based on the similar images.

Another object of the present disclosure is to provide a method in which the guiding of the variational autoencoder includes biasing or forcing images from a similar category or similar family to be closer to one another.

An object of the present disclosure is to provide an artificial intelligence (AI) device including a memory configured to store item information, and a controller configured to receive a request for a recommendation, determine a selected recommender from among a behavior-based recommender, a review-based recommender and an image-based recommender based on at least one of a modality of the request, a format of the request and a content of the request, input the request to the selected recommender, generate recommendation results based on knowledge graph embeddings corresponding to the selected recommender, and output the recommendation results.

In addition to the objects of the present disclosure as mentioned above, additional objects and features of the present disclosure will be clearly understood by those skilled in the art from the following description of the present disclosure.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, which are briefly described below.

DETAILED DESCRIPTION OF THE EMBODIMENTS

Figure 1:
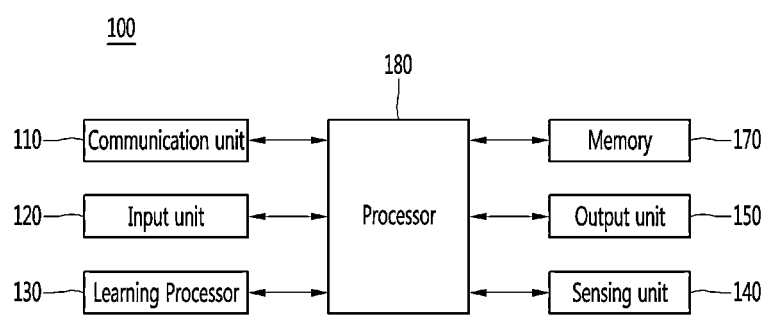
FIG. 1 illustrates an AI device according to an embodiment of the present disclosure.

Reference will now be made in detail to the embodiments of the present disclosure, examples of which are illustrated in the accompanying drawings.

Wherever possible, the same reference numbers will be used throughout the drawings to refer to the same or like parts.

Advantages and features of the present disclosure, and implementation methods thereof will be clarified through following embodiments described with reference to the accompanying drawings.

The present disclosure can, however, be embodied in different forms and should not be construed as limited to the embodiments set forth herein.

Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details.

Like reference numerals refer to like elements throughout. In the following description, when the detailed description of the relevant known function or configuration is determined to unnecessarily obscure the important point of the present disclosure, the detailed description will be omitted.

In a situation where "comprise," "have," and "include" described in the present specification are used, another part can be added unless "only" is used. The terms of a singular form can include plural forms unless referred to the contrary.

In construing an element, the element is construed as including an error range although there is no explicit description. In describing a position relationship, for example, when a position relation between two parts is described as "on," "over," "under," and "next," one or more other parts can be disposed between the two parts unless 'just' or 'direct' is used.

In describing a temporal relationship, for example, when the temporal order is described as "after," "subsequent," "next," and "before," a situation which is not continuous can be included, unless "just" or "direct" is used.

It will be understood that, although the terms "first," "second," etc. can be used herein to describe various elements, these elements should not be limited by these terms.

These terms are only used to distinguish one element from another. For example, a first element could be termed a second element, and, similarly, a second element could be termed a first element, without departing from the scope of the present disclosure.

Further, "X-axis direction," "Y-axis direction" and "Z-axis direction" should not be construed by a geometric relation only of a mutual vertical relation and can have broader directionality within the range that elements of the present disclosure can act functionally.

The term "at least one" should be understood as including any and all combinations of one or more of the associated listed items.

For example, the meaning of "at least one of a first item, a second item and a third item" denotes the combination of all items proposed from two or more of the first item, the second item and the third item as well as the first item, the second item or the third item.

Features of various embodiments of the present disclosure can be partially or overall coupled to or combined with each other and can be variously inter-operated with each other and driven technically as those skilled in the art can sufficiently understand. The embodiments of the present disclosure can be carried out independently from each other or can be carried out together in co-dependent relationship.

Hereinafter, the preferred embodiments of the present disclosure will be described in detail with reference to the accompanying drawings. All the components of each device or apparatus according to all embodiments of the present disclosure are operatively coupled and configured.

Artificial intelligence (AI) refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and can mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network can include an input layer, an output layer, and optionally one or more hidden layers. Each layer includes one or more neurons, and the artificial neural network can include a synapse that links neurons to neurons. In the artificial neural network, each neuron can output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network can be to determine the model parameters that minimize a loss function. The loss function can be used as an index to determine optimal model parameters in the learning process of the artificial neural network.

Machine learning can be classified into supervised learning, unsupervised learning, and reinforcement learning according to a learning method.

The supervised learning can refer to a method of learning an artificial neural network in a state in which a label for learning data is given, and the label can mean the correct answer (or result value) that the artificial neural network must infer when the learning data is input to the artificial neural network. The unsupervised learning can refer to a method of learning an artificial neural network in a state in which a label for learning data is not given. The reinforcement learning can refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving can include a technology for maintaining a lane while driving, a technology for automatically adjusting a speed, such as adaptive cruise control, a technique for automatically traveling along a predetermined route, and a technology for automatically setting and traveling a route when a destination is set.

The vehicle can include a vehicle having only an internal combustion engine, a hybrid vehicle having an internal combustion engine and an electric motor together, and an electric vehicle having only an electric motor, and can include not only an automobile but also a train, a motorcycle, and the like.

At this time, the self-driving vehicle can be regarded as a robot having a self-driving function.

FIG. 1 illustrates an artificial intelligence (AI) device 100 according to one embodiment.

The AI device 100 can be implemented by a stationary device or a mobile device, such as a television (TV), a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like. However, other variations are possible.

Referring to FIG. 1, the AI device 100 can include a communication unit 110 (e.g., transceiver), an input unit 120 (e.g., touchscreen, keyboard, mouse, microphone, etc.), a learning processor 130, a sensing unit 140 (e.g., one or more sensors or one or more cameras), an output unit 150 (e.g., a display or speaker), a memory 170, and a processor 180 (e.g., a controller).

The communication unit 110 (e.g., communication interface or transceiver) can transmit and receive data to and from external devices such as other AI devices 100a to 100e and the AI server 200 by using wire/wireless communication technology. For example, the communication unit 110 can transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), BLUETOOTH, RFID (Radio Frequency Identification), Infrared Data Association (IrDA), ZIGBEE, NFC (Near Field Communication), and the like.

The input unit 120 can acquire various kinds of data.

At this time, the input unit 120 can include a camera for inputting a video signal, a microphone for receiving an audio signal, and a user input unit for receiving information from a user. The camera or the microphone can be treated as a sensor, and the signal acquired from the camera or the microphone can be referred to as sensing data or sensor information.

The input unit 120 can acquire a learning data for model learning and an input data to be used when an output is acquired by using learning model. The input unit 120 can acquire raw input data. In this situation, the processor 180 or the learning processor 130 can extract an input feature by preprocessing the input data.

The learning processor 130 can learn a model composed of an artificial neural network by using learning data. The learned artificial neural network can be referred to as a learning model. The learning model can be used to an infer result value for new input data rather than learning data, and the inferred value can be used as a basis for determination to perform a certain operation.

At this time, the learning processor 130 can perform AI processing together with the learning processor 240 of the AI server 200.

At this time, the learning processor 130 can include a memory integrated or implemented in the AI device 100. Alternatively, the learning processor 130 can be implemented by using the memory 170, an external memory directly connected to the AI device 100, or a memory held in an external device.

The sensing unit 140 can acquire at least one of internal information about the AI device 100, ambient environment information about the AI device 100, and user information by using various sensors.

Examples of the sensors included in the sensing unit 140 can include a proximity sensor, an illuminance sensor, an acceleration sensor, a magnetic sensor, a gyro sensor, an inertial sensor, an RGB sensor, an IR (infrared) sensor, a fingerprint recognition sensor, an ultrasonic sensor, an optical sensor, a camera, a microphone, a lidar, and a radar.

The output unit 150 can generate an output related to a visual sense, an auditory sense, or a haptic sense.

At this time, the output unit 150 can include a display unit for outputting time information, a speaker for outputting auditory information, and a haptic module for outputting haptic information.

The memory 170 can store data that supports various functions of the AI device 100. For example, the memory 170 can store input data acquired by the input unit 120, learning data, a learning model, a learning history, and the like.

The processor 180 can determine at least one executable operation of the AI device 100 based on information determined or generated by using a data analysis algorithm or a machine learning algorithm. The processor 180 can control the components of the AI device 100 to execute the determined operation. For example, the processor 180 can execute a recommender or a recommendation system. The recommender can recommend an item to a user or an action to pursue from available options or actions.

To this end, the processor 180 can request, search, receive, or utilize data of the learning processor 130 or the memory 170. The processor 180 can control the components of the AI device 100 to execute the predicted operation or the operation determined to be desirable among the at least one executable operation.

When the connection of an external device is required to perform the determined operation, the processor 180 can generate a control signal for controlling the external device and can transmit the generated control signal to the external device.

The processor 180 can acquire information for the user input and can determine a recommended item or action based on the acquired intention information.

The processor 180 can acquire the information corresponding to the user input by using at least one of a speech to text (STT) engine for converting speech input into a text string or a natural language processing (NLP) engine for acquiring intention information of a natural language.

At least one of the STT engine or the NLP engine can be configured as an artificial neural network, at least part of which is learned according to the machine learning algorithm. At least one of the STT engine or the NLP engine can be learned by the learning processor 130, can be learned by the learning processor 240 of the AI server 200 (see FIG. 2), or can be learned by their distributed processing.

The processor 180 can collect history information including user profile information, the operation contents of the AI apparatus 100 or the user's feedback on the operation and can store the collected history information in the memory 170 or the learning processor 130 or transmit the collected history information to the external device such as the AI server 200. The collected history information can be used to update the learning model.

The processor 180 can control at least part of the components of AI device 100 to drive an application program stored in memory 170. Furthermore, the processor 180 can operate two or more of the components included in the AI device 100 in combination to drive the application program.

Figure 2:
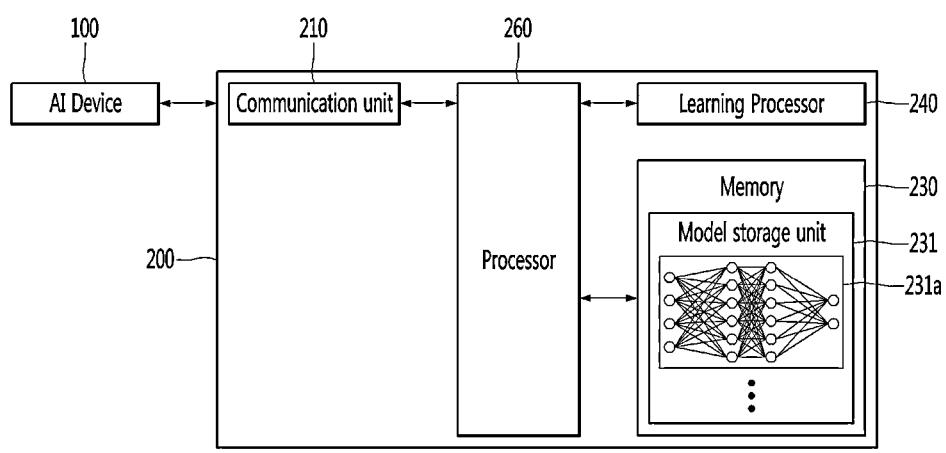
FIG. 2 illustrates an AI server according to an embodiment of the present disclosure.

FIG. 2 illustrates an AI server connected to a robot according to one embodiment.

Referring to FIG. 2, the AI server 200 can refer to a device that learns an artificial neural network by using a machine learning algorithm or uses a learned artificial neural network. The AI server 200 can include a plurality of servers to perform distributed processing, or can be defined as a 5G network, 6G network or other communications network. At this time, the AI server 200 can be included as a partial configuration of the AI device 100, and can perform at least part of the AI processing together.

The AI server 200 can include a communication unit 210, a memory 230, a learning processor 240, a processor 260, and the like.

The communication unit 210 can transmit and receive data to and from an external device such as the AI device 100.

The memory 230 can include a model storage unit 231. The model storage unit 231 can store a learning or learned model (or an artificial neural network 231a) through the learning processor 240.

The learning processor 240 can learn the artificial neural network 231a by using the learning data. The learning model can be used in a state of being mounted on the AI server 200 of the artificial neural network, or can be used in a state of being mounted on an external device such as the AI device 100.

The learning model can be implemented in hardware, software, or a combination of hardware and software. If all or part of the learning models are implemented in software, one or more instructions that constitute the learning model can be stored in memory 230.

The processor 260 can infer the result value for new input data by using the learning model and can generate a response or a control command based on the inferred result value.

Figure 3:
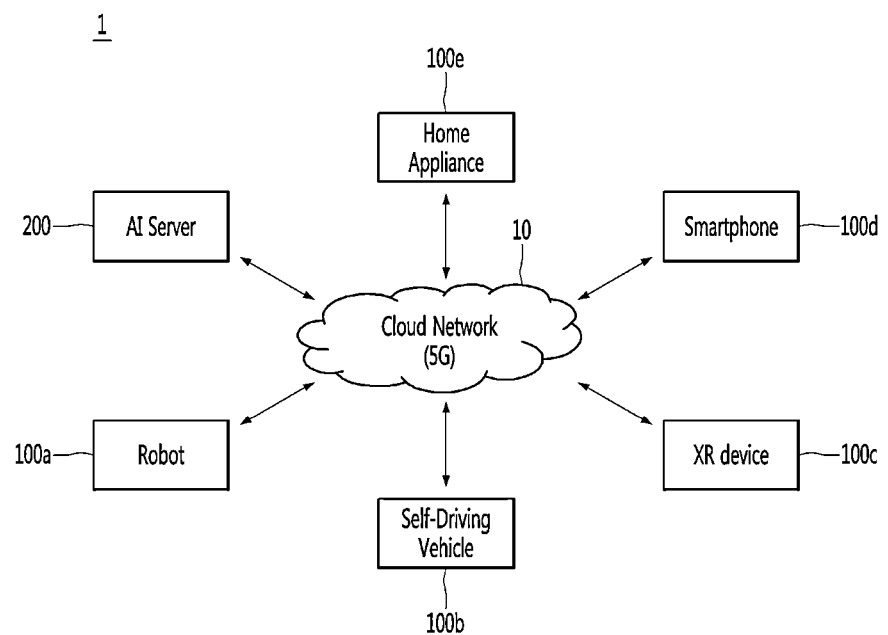
FIG. 3 illustrates an AI device according to an embodiment of the present disclosure.

FIG. 3 illustrates an AI system 1 including a terminal device according to one embodiment.

Referring to FIG. 3, in the AI system 1, at least one of an AI server 200, a robot 100a, a self-driving vehicle 100b, an XR (extended reality) device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, can be referred to as AI devices 100a to 100e. The AI server 200 of FIG. 3 can have the configuration of the AI server 200 of FIG. 2.

According to an embodiment, the recommender can be implemented as an application or program that can be downloaded or installed in the smartphone 100d, which can communicate with the AI server 200, but embodiments are not limited thereto.

The cloud network 10 can refer to a network that forms part of a cloud computing infrastructure or exists in a cloud computing infrastructure. The cloud network 10 can be configured by using a 3G network, a 4G or LTE network, a 5G network, a 6G network, or other network.

For instance, the devices 100a to 100e and 200 configuring the AI system 1 can be connected to each other through the cloud network 10. In particular, each of the devices 100a to 100e and 200 can communicate with each other through a base station, but can directly communicate with each other without using a base station.

The AI server 200 can include a server that performs AI processing and a server that performs operations on big data.

The AI server 200 can be connected to at least one of the AI devices constituting the AI system 1, that is, the robot 100a, the self-driving vehicle 100b, the XR device 100c, the smartphone 100d, or the home appliance 100e through the cloud network 10, and can assist at least part of AI processing of the connected AI devices 100a to 100e.

At this time, the AI server 200 can learn the artificial neural network according to the machine learning algorithm instead of the AI devices 100a to 100e, and can directly store the learning model or transmit the learning model to the AI devices 100a to 100e.

At this time, the AI server 200 can receive input data from the AI devices 100a to 100e, can infer the result value for the received input data by using the learning model, can generate a response or a control command based on the inferred result value, and can transmit the response or the control command to the AI devices 100a to 100e. Each AI device 100a to 100e can have the configuration of the AI device 100 of FIGS. 1 and 2 or other suitable configurations.

Alternatively, the AI devices 100a to 100e can infer the result value for the input data by directly using the learning model, and can generate the response or the control command based on the inference result.

Hereinafter, various embodiments of the AI devices 100a to 100e to which the above-described technology is applied will be described. The AI devices 100a to 100e illustrated in FIG. 3 can be regarded as a specific embodiment of the AI device 100 illustrated in FIG. 1.

According to an embodiment, the home applicant 100e can be a smart television (TV), smart microwave, smart oven, smart refrigerator or other display device, which can implement a recommender or recommendation system. The recommender can be the form of an executable application or program.

The robot 100a, to which the AI technology is applied, can be implemented as an entertainment robot, a guide robot, a carrying robot, a cleaning robot, a wearable robot, a pet robot, an unmanned flying robot, or the like.

The robot 100a can include a robot control module for controlling the operation, and the robot control module can refer to a software module or a chip implementing the software module by hardware.

The robot 100a can acquire state information about the robot 100a by using sensor information acquired from various kinds of sensors, can detect (recognize) surrounding environment and objects, can generate map data, can determine the route and the travel plan, can determine the response to user interaction, or can determine the operation.

The robot 100a can use the sensor information acquired from at least one sensor among the lidar, the radar, and the camera to determine the travel route and the travel plan.

The robot 100a can perform the above-described operations by using the learning model composed of at least one artificial neural network. For example, the robot 100a can recognize the surrounding environment and the objects by using the learning model, and can determine the operation by using the recognized surrounding information or object information. The learning model can be learned directly from the robot 100a or can be learned from an external device such as the AI server 200.

At this time, the robot 100a can perform the operation by generating the result by directly using the learning model, but the sensor information can be transmitted to the external device such as the AI server 200 and the generated result can be received to perform the operation.

The robot 100a can use at least one of the map data, the object information detected from the sensor information, or the object information acquired from the external apparatus to determine the travel route and the travel plan, and can control the driving unit such that the robot 100a travels along the determined travel route and travel plan. Further, the robot 100a can implement a recommender to determine an action to pursue or an item to recommend.

The map data can include object identification information about various objects arranged in the space in which the robot 100*a* moves. For example, the map data can include object identification information about fixed objects such as walls and doors and movable objects such as pollen and desks. The object identification information can include a name, a type, a distance, and a position.

In addition, the robot 100*a* can perform the operation or travel by controlling the driving unit based on the control/ interaction of the user. At this time, the robot 100*a* can acquire the intention information of the interaction due to the user's operation or speech utterance, and can determine the response based on the acquired intention information, and can perform the operation.

The robot 100*a*, to which the AI technology and the self-driving technology are applied, can be implemented as a guide robot, a carrying robot, a cleaning robot (e.g., an automated vacuum cleaner), a wearable robot, an entertainment robot, a pet robot, an unmanned flying robot (e.g., a drone or quadcopter), or the like.

The robot 100*a*, to which the AI technology and the self-driving technology are applied, can refer to the robot itself having the self-driving function or the robot 100*a* interacting with the self-driving vehicle 100*b*.

The robot 100*a* having the self-driving function can collectively refer to a device that moves for itself along the given movement line without the user's control or moves for itself by determining the movement line by itself.

The robot 100*a* and the self-driving vehicle 100*b* having the self-driving function can use a common sensing method to determine at least one of the travel route or the travel plan. For example, the robot 100*a* and the self-driving vehicle 100*b* having the self-driving function can determine at least one of the travel route or the travel plan by using the information sensed through the lidar, the radar, and the camera.

The robot 100*a* that interacts with the self-driving vehicle 100*b* exists separately from the self-driving vehicle 100*b* and can perform operations interworking with the self-driving function of the self-driving vehicle 100*b* or interworking with the user who rides on the self-driving vehicle 100*b*.

Also, according to an embodiment, the robot 100*a* can be a cleaning robot that can execute a recommender and choose from among a plurality of different routes or methods for cleaning a given space (e.g., a room), and upon completion of the job or cleaning, a user can provide feedback (e.g., please rate the job on a scale of 1 to 5, etc.). During a subsequent session, the robot 100*a*, executing the recommender, can recommend a route or method for the user to select or try out.

According to another embodiment, the robot 100*a* can be a food preparation robot or a chef robot configured to automatically prep ingredients and prepare and cook a meal or food dish.

In addition, the robot 100*a* interacting with the self-driving vehicle 100*b* can control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* can monitor the user boarding the self-driving vehicle 100*b*, or can control the function of the self-driving vehicle 100*b* through the interaction with the user. For example, when it is determined that the driver is in a drowsy state, the robot 100*a* can activate the self-driving function of the self-driving vehicle 100*b* or assist the control of the driving unit of the self-driving vehicle 100*b*. The function of the self-driving vehicle 100*b* controlled by the robot 100*a* can include not only the self-driving function but also the function provided by the navigation system or the audio system provided in the self-driving vehicle 100*b*.

Alternatively, the robot 100*a* that interacts with the self-driving vehicle 100*b* can provide information or assist the function to the self-driving vehicle 100*b* outside the self-driving vehicle 100*b*. For example, the robot 100*a* can provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

Also, according to an embodiment, the self-driving vehicle 100*b* that can execute a recommender and choose from among a plurality of different routes or commutes to arrive at a user destination, and upon arrival, a user can provide feedback (e.g., please rate the driving session or commute on a scale of 1 to 5, etc.). Also, user ratings can be normalized (e.g., to be 1 or 0, etc.). During a subsequent session, the self-driving vehicle 100*b*, configured with the recommender, can recommend a different route or commute to the user to try out.

According to an embodiment, the AI device 100 can be a recommender device that is configured to recommend an item, a route or an action to pursue, in which the recommender device can receive inputs according to multiple modalities.

According to another embodiment, the AI device 100 can be a recommender device that is integrated into an infotainment system of the self-driving vehicle 100*b*, which can recommend content based on various input modalities, the content can include one or more of audio recordings, video, music, pod casts, etc., but embodiments are not limited thereto. Also, the AI device 100 can be a recommender device that is integrated into an infotainment system of the manual or human-driving vehicle.

Figure 4:
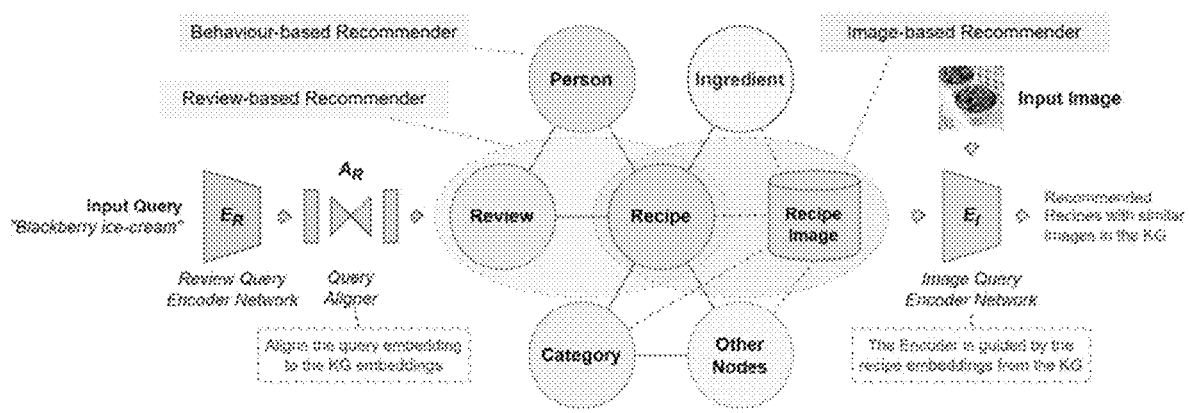
FIG. 4 illustrates an example ground level architecture of a recommender according to an embodiment of the present disclosure.

With reference to FIG. 4, FIG. 4 shows an example overall configuration of the AI device 100 configured to implement a recommender (e.g., recommendation system) that includes a behavior-based recommender, a review-based recommender and an image-based recommender, in which the recommender is configured to handle different modalities and multiple purposes.

FIG. 4 illustrates a framework including the components of AI device 100 implementing a recommender. At the heart or center of framework is a knowledge graph with entities such as recipes, persons, ingredients, reviews, etc. The recommender can leverage knowledge graph embedding (KGE) models to generate vector representations (embeddings) for entities and relations within the knowledge graph. According to an embodiment, the recommender can be KGE-agnostic, meaning it can be combined with various KGE algorithms, although different algorithms may lead to varying performance levels or can be selecting based on context or specific needs or constraints.

According to an embodiment, the recommender including a behavior-based recommender, a review-based recommender and an image-based recommender can be implemented by a same processor, but embodiments are not limited thereto. For example, each of the behavior-based recommender, the review-based recommender and the image-based recommender can be implemented by separate processors or hardware circuits and can be configured to communicate with each other or under the control of a separate controller or processor.

The behavior-based recommender (BRS) can perform a link prediction task between the person and recipe entities in the graph. For example, the behavior-based recommender can predict whether a user will like a recipe by analyzing the connections between the user in the knowledge graph. According to an embodiment, the behavior-based recommender can perform a zero-shot inference approach and conditional recommendation (CR) based on the clusters of recipes (e.g., clusters of topics or categories) that the user may like.

The review-based recommender (RRS) can encode an input query (e.g., "Blackberry ice-cream"), and match it with reviews across all recipes in the knowledge graph (KG) to recommend recipes to the user. According to an embodiment, review-based recommender can implement a hybrid approach that aggregates results from two different sources, such as combining results generated by using a pre-trained natural language processing (NLP) embedding model with results generated from a pre-trained knowledge graph embedding (KGE) model, in order to create an aggregated list of results that is more accurate and more relevant to the input request.

The image-based recommender (IRS) can obtain latent representations of an input image for finding similar recipes or foods. In other words, the image-based recommender can analyze an input image and extracts its key features, and these features are then used to recommend visually similar recipes or foods to the user. According to an embodiment, the image-based recommender can be guided with knowledge graph embeddings (KGE) to provide more relevant results.

According to an embodiment, the AI device 100 implementing the recommender can receive an input query or an initiation event (e.g., a user login, device power-on event, starting of a car, etc.), at least one of the behavior-based recommender, the review-based recommender and the image-based recommender can be determined to provide one or more recommendation results, and the one or more recommendation results can be output to the user.

Also, according to an embodiment, an initiation event that generates a request for a recommendation can include one or more of a user logging into an application or device, a user walking past a proximity sensor or pressing a button on a device, such as a power on or start button (e.g., a smart fridge, television or microwave, etc.). In response to the initiation event, an internal recommendation request or query can be generated and input to the recommender, and the recommender can automatically return recommendation results to a user, even when the user did not explicitly make any such request.

In addition, the input to the recommender can be a textual query or request from a user, a natural language processing (NLP) text or voice input, an input image or video, but embodiments are not limited thereto.

According to another embodiment, the initiation event that generates an internal query request can be initiated based on a geographic location of the user's device, such as crossing a state boarder, entering a store or restaurant, walking through a door, etc., but embodiments are not limited thereto. Also, the initiation event can be based on one or more of a time of day, season, year, or holiday event, but embodiments are not limited thereto.

As shown in FIG. 4, the recommender can be specifically configured to recommend recipes, but embodiments are not limited thereto. For example, the AI device 100 implementing a recommender can be configured to recommend movies, products, clothes, videos, webpages, flights, vacation packages, routes, etc., according to embodiments.

Also, the behavior-based recommender can be referred to as a behavior-based recommender sub-system or part, the review-based recommender can be referred to as a review-based recommender sub-system or part, and the image-based recommender can be referred to as an image-based recommender sub-system or part, but embodiments are not limited thereto.

According to an embodiment, each of the behavior-based recommender, the review-based recommender and the image-based recommender can index into, share or reference the same recipe database or same knowledge graph. Further, each of the behavior-based recommender, the review-based recommender and the image-based recommender can implement its own knowledge graph or database, in which the different knowledges graphs can all share the same or similar recipe data, but embodiments are not limited thereto.

The recommender can used one or more knowledge graphs. A knowledge graph can provide a structured way to represent information about entities and their relationships, which can be used to make more accurate and personalized recommendations. The knowledge graph can encode entities (e.g., users, items, recipes, food dishes, attributes, etc.) and their relationships (e.g., purchased, ate, cooked, viewed, similar to, etc.). This allows the recommender to understand the complex connections between different elements and how they influence user preferences.

Further, knowledge graphs can enrich user profiles by capturing not just their explicit interactions (e.g., purchases, views, meals prepared/cooked, click through events) but also their implicit preferences (e.g., browsing history). This can be done by analyzing relationships between users and items, such as "users who enjoyed this food dish or recipe also enjoyed . . . " or "users who reviewed this recipe also reviewed . . . ." In this way, the recommender does not need to rely solely or heavily on just explicit user feedback (e.g., ratings or purchases).

In addition, the recommender can use knowledge graphs to aid in making recommendations that are not just relevant but also surprising and interesting to the user. By exploring the connectedness of entities, the recommender can discover hidden relationships and recommend items that the user might not have considered but are likely to enjoy. In this way, by incorporating rich information about entities and their relationships, the recommender can make more personalized, accurate, and even surprising recommendations, leading to a more satisfying user experience.

According to an embodiment, the recommender can include one or more knowledge graphs that include entities and properties or information about people (e.g., names, user IDs), profile information (e.g., age, gender, weight, location, etc.), recipe categories, ingredients, images, purchases and reviews.

As illustrated in FIG. 4, an input query (e.g., user request, activation event or system request) can be input to a review query encoder network (e.g., $E_R$) which processes or formats the query to provide an input to a query aligner (e.g., $A_R$) to generate an aligned output. For example, the input query can be in to form of natural language text or user conversation input, and the encoder can map entities into numerical vectors referred to as embeddings. Also, the query aligner (e.g., $A_R$) can process the input so that natural language processing (NLP) embeddings can be aligned with the knowledge graph embeddings.

According to an embodiment, based on the modality of the input or input context, a recommender (e.g., a recommendation sub-system or sub-recommender) is determined or selected from among the behavior-based recommender, the review-based recommender and the image-based recommender. The aligned output generated from the query aligner (e.g., $A_R$) is transferred to the review-based recommender, and the image query encoder (e.g., $E_I$) encodes existing recipes' images for the image-based recommender.

Further in this example, the review-based recommender processes the aligned output from the query aligner (e.g., $A_R$) and outputs recipe recommendation results. Also, the image-based recommender processes the input image query and existing recipes' images, by encoding them using the image query encoder (e.g., $E_I$), and outputs recipe recommendation results. Aspects and components of each of the behavior-based recommender, the review-based recommender and the image-based recommender are described in more detail below.

Figure 5:
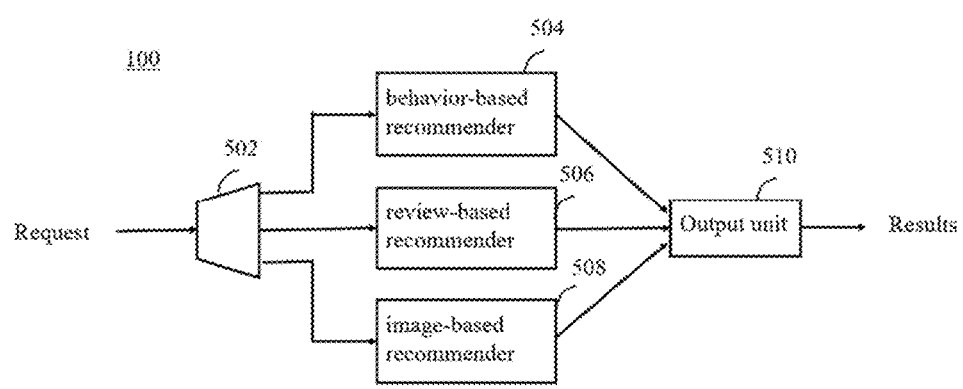
FIG. 5 shows an overview of components of the recommender in the AI device, according to an embodiment of the present invention.

FIG. 5 shows a simplified overview of components of the recommender in the AI device 100, according to an embodiment of the present invention. For example, the AI device 100 implementing the recommender can include a selector unit 502 (e.g., a determiner), a behavior-based recommender 504, a review-based recommender 506, an image-based recommender 508, an output unit 510.

According to an embodiment, the selector unit 502 can receive a request for a recommendation and route the request to one or more of the behavior-based recommender 504, a review-based recommender 506, an image-based recommender 508. Further, one or more of the behavior-based recommender 504, the review-based recommender 506, the image-based recommender 508 can output recommendation results based on the request.

Further in this example, the request can be an active type of request received from a user, such as a textual input query or a voice query from the user, or a passive type of request, such as an initiation event or trigger event (e.g., login event, loading or viewing of a webpage, opening or execution of an application, etc.). Also, the request can be routed to one or more of the behavior-based recommender 504, the review-based recommender 506, the image-based recommender 508 based on a context or format of the request. For example, a text based input request can be routed to the review-based recommender 506 and an input request including an image can be routed to the image-based recommender 508, but embodiments are not limited thereto.

According to another embodiment, the request can be routed to two or more of the behavior-based recommender 504, the review-based recommender 506 and the image-based recommender 508, and results output from the two or more of the behavior-based recommender 504, the review-based recommender 506 and the image-based recommender 508 can be aggregated together in a complied recommendation list.

In addition, the various components shown in FIG. 5 can all be implemented by a same processor or one or more of the various components can be implemented by separate processors or hardware circuits, but embodiments are not limited thereto.

Also, FIG. 5 illustrates an example of the various components being contained within the AI device 100, but one or more of the various components can be implemented by the AI sever 200, according to embodiments. For instance, according to an embodiment, the AI device 100 (e.g., a user's smart phone) can receive the request and the request can be transmitted to the AI sever 200 which can include the components shown in FIG. 5, and the AI sever 200 can return the results to the AI device 100 for presentation to the user.

According to an embodiment, the AI device 100 can execute a recommendation method including receiving, via a processor in the AI device, a request for a recommendation, determining, via the processor, a selected recommender from among the behavior-based recommender, the review-based recommender and the image-based recommender based on at least one of a modality of the request, a format of the request and a content of the request. Also, the method can further include transmitting, via the processor, the request to the selected recommender, generating, via the processor, recommendation results based on knowledge graph embeddings corresponding to the selected recommender, and outputting, via an output unit in the AI device, the recommendation results. For example, the output unit can include one or more of a display and a speaker.

According to an embodiment, the AI device 100 including the recommender can obtain a neural NLP embedding for each entity using their (textual) properties. For example, as shown in Equation [1] below, an embedding vector is calculated for a given recipe, person, or review entity. For recipe k, denoted by $rcp_k$, the embedding vector is the average of its name and instructions embedding vectors.

$z_{rcp_k}$=avg(emb(name|$rcp_k$),emb(instructions|$rcp_k$))

$z_{psn_k}$=avg($z_{rvw_1}$, ... ,$z_{rvw_m}$|$psn_k$) where $z_{rvw_i}$=emb (review content|$rvw_i$)  Equation 1:

In addition, the embedding vector for person k, denoted by $psn_k$, is the average of embedding vectors of their reviews, i.e., $rvw_1$ to $rvw_m$ (where m is the total number of reviews for $psn_k$), in the training data. The recommender can replace z with ẑ when it reduces the dimension of the embeddings.

Similarly, the recommender obtains embeddings of ingredients and recipe categories. Function emb embeds a textual input and function avg calculates the average of embeddings. Once all pre-trained embeddings are obtained, the recommender initializes the entity weights with them for knowledge graph embedding (KGE) training for the corresponding settings.

Figure 6:
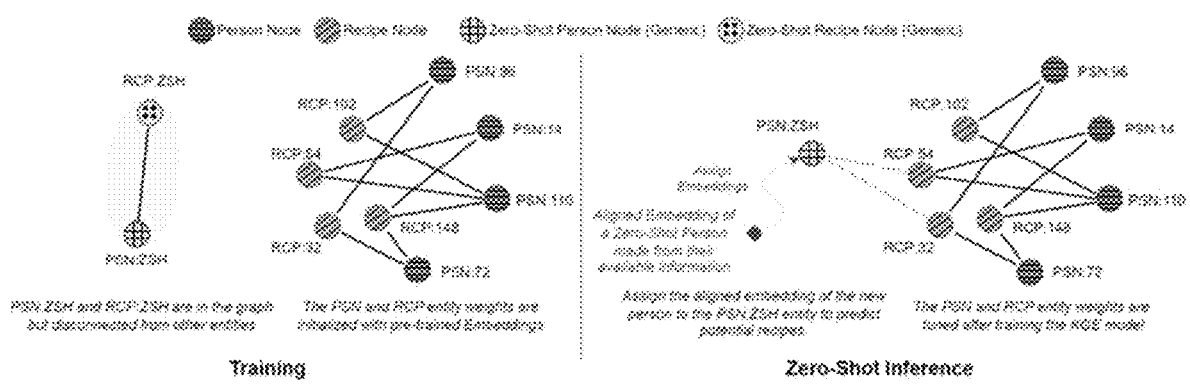
FIGS. 6 and 7 illustrate aspects of the behavior-based recommender, according to embodiments of the present disclosure.
Figure 7:
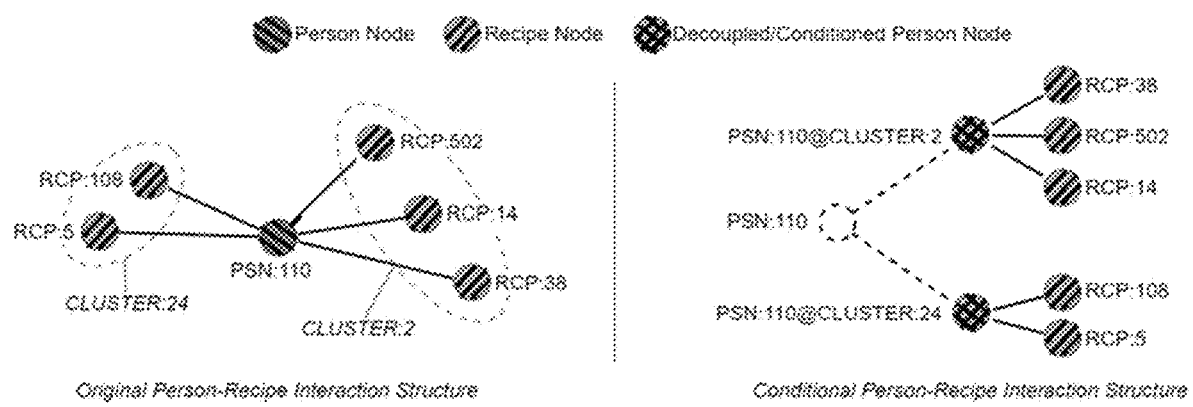

FIGS. 6 and 7 illustrate aspects of the behavior-based recommender, according to an embodiment of the present disclosure. FIG. 6 shows an example of zero-shot inference for recipe recommendation to new users, and FIG. 7 shows an example regarding original vs. conditional person-recipe interaction structures.

According to an embodiment, the behavior-based recommender can use the interactions among the person (e.g., the user) and recipe entities in the knowledge graph. For example, in the knowledge graph, if a user likes a recipe, then there is an interaction between the user and that recipe. The Person-Recipe subgraph is shown by an elliptical in FIG. 4. This information can be used to train a knowledge graph embedding (KGE) model to predict whether a link exists between a user and a recipe.

For example, the knowledge graph embedding model can learn numerical representations (embeddings) of entities and relations in the knowledge graph. Further, the knowledge graph embedding model can represents entities as vectors in a high-dimensional space. According to an embodiment, the knowledge graph embedding model can use rotations in this high-dimensional space to encode relations between entities. For example, for a relation between two entities, the vector of the first entity can be rotated by a certain angle to get the vector of the second entity, in which the angle of rotation captures the nature of the relation.

In addition, a margin-based ranking loss function can be used to train the knowledge graph embedding model. This loss function can ensure that the distance between the embeddings of entities connected by a positive relation is smaller than the distance between the embeddings of entities not connected by that relation. Accordingly, the trained knowledge graph embedding model can be used to predict missing links in the knowledge graph, classify entities based on their relationships to other entities, and answer questions or queries based on knowledge contained in the knowledge graph.

In addition, generating the trained knowledge graph embedding model can include training one or more various models including RotateE, TransE and ComplEx, but embodiments are not limited thereto. For example, different models can be used depending on the situation, context and desired results.

With reference to FIG. 6, the AI device 100 including the recommender can use the behavior-based recommender to address issues regarding zero-shot recommendation (e.g., cold start). Zero-shot or cold start refers to a challenge for recommendation systems with regards to when new users join a platform, and no personalized recommendations can be made for them because they have no ratings or few interactions, e.g., clicks, views or purchases.

According to an embodiment, the behavior-based recommender can use the links among the person and recipe entities in the graph. For example, if a user likes a recipe, there is a link between the user and the recipe. The Person-Recipe subgraph is shown by an ellipse in FIG. 4.

Further in this example, the behavior-based recommender can train a knowledge graph embedding (KGE) model to predict whether a link exists between a user and a recipe. The KGE model can be a rotation based model, such as RotatE, but embodiments are not limited thereto.

In addition, the score function $f$ measures the salience of a candidate triplet (h, r, t) and its formulation varies from one KGE algorithm to another. According to an embodiment, regardless of the type of KGE model used, the function $f$ receives the embeddings of users and recipes as well as the embedding of the predicate (or relation) to calculate their triplet scores. As shown below, Equation [2] calculates the score for triplet ($psn_i$, $p_{psn:likes:rcp}$, $rcp_j$), where $z_{psn_i}$, $z_{psn:likes:rcp}$, and $z_{rcp_j}$ are the embeddings of user i, predicate psn:likes:rcp, and recipe j, respectively.

$$score = f(z_{psn_i}, z_{psn:likes:rcp}, z_{rcp_j}) \quad \text{Equation 2:}$$

In this way, the behavior-based recommender part of the recommender can use the trained KGE model for link prediction, and then rank predictions with respect to their scores for recommendation.

According to an embodiment, the behavior-based recommender can address the cold start issue by employing pre-trained natural language processing (NLP) embeddings. For example, FIG. 6 illustrates a solution for zero-shot inference. To address the cold start problem for new users, a placeholder node PSN:ZSH can be introduced to the knowledge graph. The placeholder node PSN:ZSH remains isolated from actual recipes while the embedding model learns user-recipe interactions from existing data.

Further in this example, when a new user enters the system, their immediate information (e.g., profile, preferences, dietary habits) is converted into an NLP embedding. This NLP embedding is then aligned with the knowledge graph embedding space (e.g., similar to the interaction alignment structures shown FIG. 7), and suitable recipes can be predicted as recommendations for the user through link prediction. In this way, the behavior-based recommender can provide more relevant and more accurate recommendations even for new users.

With reference to FIG. 7, the behavior-based recommender can address issues regarding disparate interests of a user. For example, a user may prefer a specific type of Italian food (e.g., spaghetti with meat balls), a certain type of Indian dish (e.g., chicken vindaloo) and an American style cheeseburger. However, when a user has a wide range of tastes or preferences, this can confuse other types of recommendation systems, which can lead to recommendation results that are not particularly useful or frustrating.

Also, recipes are merely used as one type of example, and the behavior-based recommender can used to other types of items or topics in a situation where a user may have a wide range of varying interests or preferences (e.g., vacations, movies, books, appliances, advertisements, hobbies, etc.).

As shown in FIG. 7, the behavior-based recommender uses conditional recommendation based on recipe clusters to personalize suggestions for users. This approach first decomposes user profiles by creating separate "conditional user nodes" for each possible recipe cluster they might be interested in. These nodes are then connected to the recipes the user likes within each cluster, maintaining the original connections. This allows the system to learn user preferences within specific categories and recommend recipes that align with those preferences.

For example, the knowledge graph can be used to train a knowledge graph embedding model and use it for inference later. In this example, person 110 likes recipes RCP:14, RCP:38, and RCP:502 from recipe cluster CLUSTER:2 as well as recipes RCP:5 and RCP:108 from recipe cluster CLUSTER:24 in the original person-recipe interaction. On the other hand, in the conditional person-recipe interaction structure, the person node is decoupled to two conditional person nodes while they are still connected to the recipes they like as in the original structure.

In other words, a person can be divided into their "different selves" which are represented as separate nodes, but the nodes all belong to the same person. For example, take a hypothetical example in which a user is half Italian and half American. This user can be modeled as two separate nodes, in which one node can represent the "Italian half" of the user (e.g., the user's preferences and interests regarding Italian food) and another node can represent the "American half" of the user (e.g., the user's preferences and interests regarding American food), but embodiments are not limited thereto.

In this way, the conditional recommendation features of the behavior-based recommender can avoid confusing the recommender in situations where a user may have very disjoint preferences (e.g., a situation where a user loves very different types of food, or likes to travel to completely different parts of the world, etc.). Accordingly, as detailed above, the recommender can leverage the pre-trained NPL embeddings in order to provide additional features, such as the conditional recommendation feature.

Again, food recipes are used merely as an example, and the conditional recommendation features of the behavior-based recommender can be applied to other situations and categories (e.g., vacations, movies, books, appliances, advertisements, cars, boats, pets, hobbies, etc.).

Figure 8:
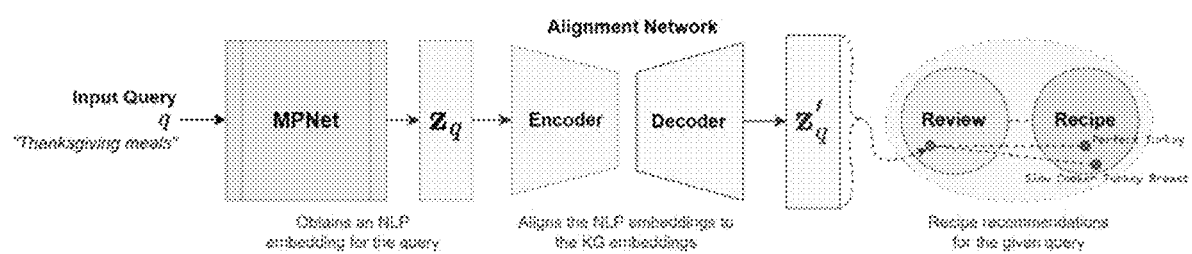
FIG. 8 illustrates an example of a review-based recommender, according to an embodiment of the present disclosure.

FIG. 8 illustrates an example of a review-based recommender, according to an embodiment of the present disclosure. For example, the review-based recommender can make recommendations based on a user's open-ended query or a free form language query (e.g., "a great birthday cake for my son!" or "Thanksgiving meals").

According to an embodiment, the review-based recommender can implement a hybrid approach that aggregates results from two different sources or two different generation methods, such as combining results generated by using a pre-trained natural language processing (NLP) embedding model and results generated from a pre-trained knowledge graph embedding (KGE) model, in order to create an aggregated list of results that is more accurate and more relevant to the input request.

According to an embodiment, the knowledge graph embedding model is trained to identify connections between reviews and recipes. Then, it leverages an alignment network to bridge the gap between natural language representations of queries and the KGE embedding space. This alignment is utilized for inference with regards to representing a user's query within the KGE framework. During this process, an aligned representation is generated for the query, enabling recipe recommendations through link prediction. For example, "Perfect Turkey" recipe and "Slow Cooker Turkey Breast" recipe are recommended for the "Thanksgiving meals" query.

According to various embodiments, the review-based recommender can utilize different model configurations for generating recommendations.

According to an embodiment, the review-based recommender can use a pre-trained natural language processing (NLP) embedding model configuration to encode both the input query and reviews as numerical vectors. For example, MPNet can be used as a model, but embodiments are not limited thereto. Then, the similarity between these vectors can be assessed using cosine similarity. In this way, the review-based recommender can identify recipes whose reviews are most closely related to the user's query, which are then recommended to the user.

According to another embodiment, the review-based recommender can use a knowledge graph embedding that is trained with a rotation based model (e.g., RotatE). Also, the knowledge graph embedding can be trained with a rotation based model having various dimensions, e.g., 768. Further in this example, MPNet can be used to convert the input query into a numerical representation. Then, an alignment network is deployed to map this numerical representation onto the embedding space used by the KGE model. This alignment process translates the query into the language of the knowledge graph and the aligned query representation can be used as a review knowledge graph embedding to predict potential or relevant recipe recommendations for the user.

According to yet another embodiment, the review-based recommender can combine the two approaches discussed above for providing a hybrid recommender that aggregates the ranked recommendation results from both approaches. For example, the review-based recommender can enhance recipe recommendations by combining the rankings generated by both the MPNet-based and KGE-based recommenders, discussed above.

Further, the review-based recommender can provide a final ranking for each recipe by averaging the individual ranking positions assigned by each recommender. In other words, the final ranking of each recipe can be calculated as the average of its individual rankings from both systems and the top recommendation results can be provided to the user (e.g., a top 10 list), but embodiments are not limited there to.

Figure 9:
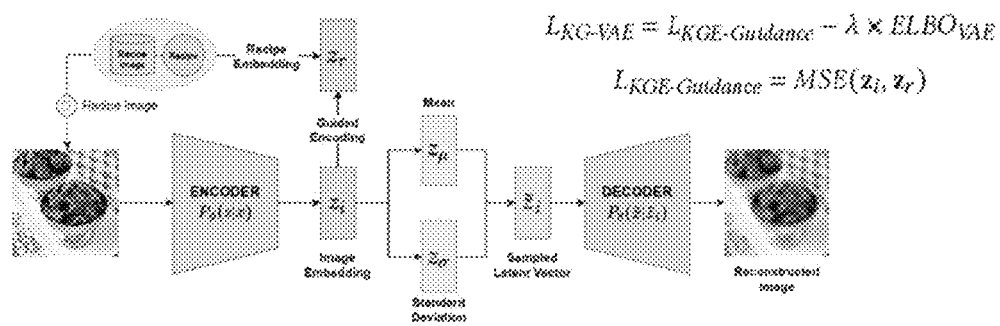
FIG. 9 illustrates an example of an image-based recommender, according to an embodiment of the present disclosure.

FIG. 9 illustrates an example of an image-based recommender, according to an embodiment of the present disclosure. For example, the image-based recommender can identify and retrieve similar recipes to an input recipe image or an input food image.

According to an embodiment, the image-based recommender can analyze an input image and extracts its key features, and these features are then used to recommend visually similar recipes or foods (or items, entities) to the user. According to an embodiment, the image-based recommender can be guided with knowledge graph embeddings (KGE) to provide more relevant results.

As shown in FIG. 9, the image-based recommender can use a KGE-guided variational autoencoder (KG-VAE) to identify and retrieve recipes that are similar to a given recipe image. The KG embedding space guides the VAE towards the knowledge graph embedding space while it concurrently learns the underlying distribution of recipe images. In other words, the KG embedding space can help bias the VAE to selecting recipes for images or foods that are within a same category.

In FIG. 9, the image embedding information (e.g., $z_i$) can be used to generate the mean (e.g., $z_\mu$) and the standard deviation (e.g., $z_\sigma$). Further, the mean (e.g., $z_\mu$) and the standard deviation (e.g., $z_\sigma$) can be used to generate the sampled latent vector (e.g., $\tilde{z}_i$). The decoder receives the sampled latent vector (e.g., $\tilde{z}_i$) and generates the reconstruction image.

In more detail, the VAE can be steered or forced by the KG embeddings of recipes. This guidance ensures that images from similar recipe families are encoded closer together in the VAE's latent space. In order to perform this type of forcing/bias operation, a configured loss function can be used, as shown in Equation [3] below, where $\lambda$ is a hyperparameter to control the contribution of VAE's ELBO, $z_i$ and $z_b$ are image and recipe embeddings, and MSE is the mean squared error loss function.

$$L_{KG\text{-}VAE} = L_{KGE\text{-}Guidance} - \lambda \times \text{ELBO}_{VAE}$$

$$L_{KGE\text{-}Guidance} = \text{MSE}(z_i, z_r) \qquad \text{Equation 3:}$$

In addition, during the inference, the encoder is only used to encode a given image. Then, the resulting encoded representation is compared with those of other recipe images to identify and retrieve visually similar recipes.

In other words, instead of simply recommending any type of food item among any category of food that has similar textures, colors and/or shapes as the input food image, the KG embedding space helps to guide or bias recommendations to remain within a same or similar category of food. For example, if the input image is a picture of a taco, the KGE-guided variational autoencoder (KG-VAE) can be biased towards recommending Tex-Mex types of foods, rather than returning any type of food that like might look similar to a taco even if it belongs to a completely different type of cuisine.

For example, a Korean beef steam bun or bao dish may look similar to a taco, but presenting this item as recommendation to the user in response to a taco input image might not be very helpful to the user and may even cause user frustration. Accordingly, the image-based recommender utilizing the KGE-guided variational autoencoder (KG-VAE) can provide more accurate and more relevant recommendation results.

Figure 10:
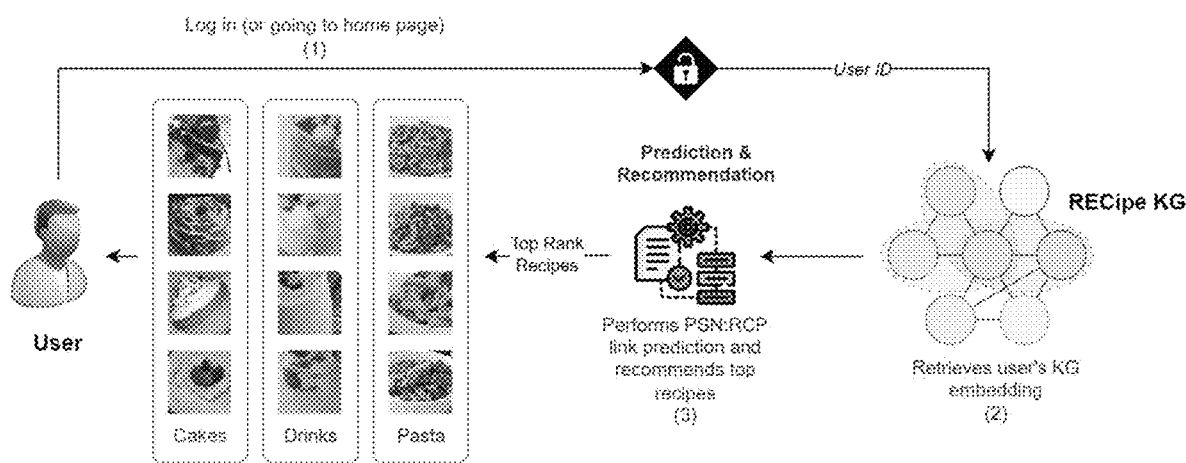
FIGS. 10, 11 and 12 illustrate example implementations of the behavior-based recommender (BRS) of the recommender, the review-based recommender (RRS) and the recommender and an image-based recommender (IRS) parts of the recommender of the AI device, respectively, according to embodiments of the present disclosure.
Figure 11:
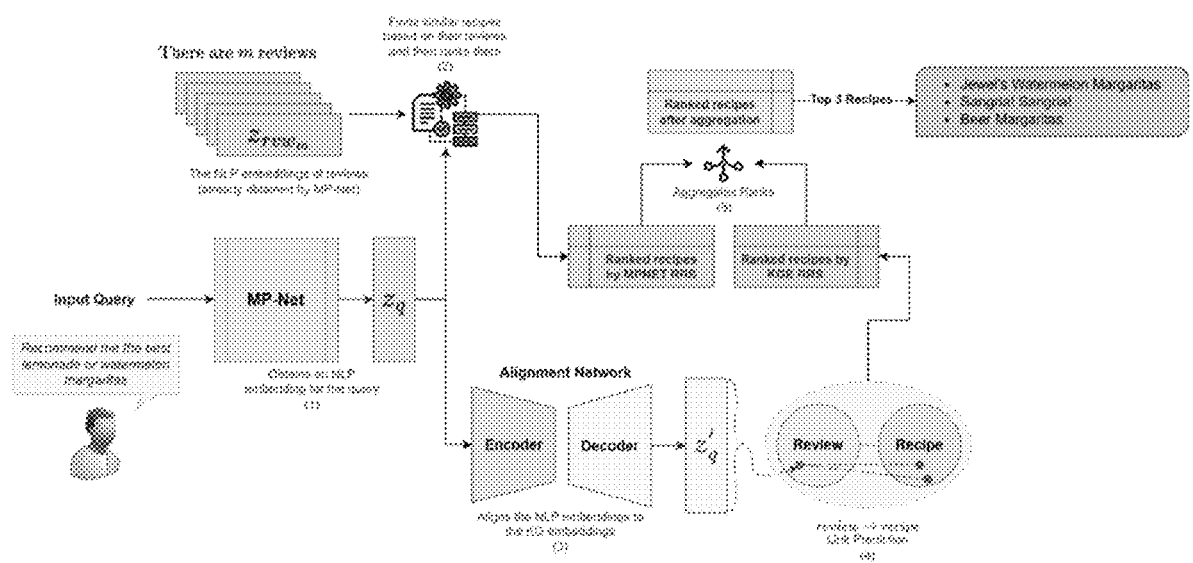
Figure 12:
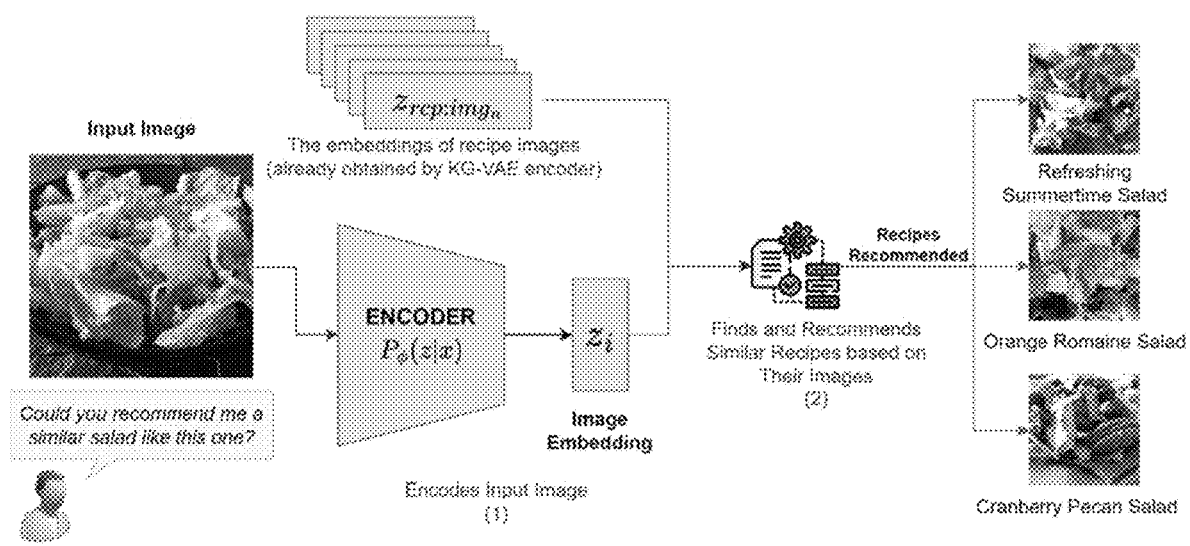

FIGS. 10, 11 and 12 illustrate example implementations of the behavior-based recommender (BRS) of the recommender, the review-based recommender (RRS) and the recommender and an image-based recommender (IRS) parts of the recommender of the AI device 100, respectively, according to embodiments of the present disclosure.

FIG. 10 shows an example of using the behavior-based recommender (BRS) of the recommender. For instance, when a user logs into the system (Step 1), a unique identifier (ID) for the user is retrieved. This ID then serves as a key to identify their corresponding user embedding within the knowledge graph (Step 2). This embedding is subsequently utilized to predict which recipes are most relevant to the user, and the top-ranked recipes are displayed for the user's consideration (Step 3). Additionally, recommendations can be tailored to specific categories, as illustrated in FIG. 10.

In FIG. 10, the situation of a user logging into the system is used as an example of an initiation event for beginning the recommendations, but embodiments are not limited thereto. For example, an initiation event (e.g., a trigger event) for beginning the recommendation process can include one or more of a user entering a home or building, entering a car or vehicle, walking past a home appliance or display device (e.g., a smart television, a smart refrigerator, microwave or oven, a smart washing machine or dryer, etc.), viewing a webpage, placing on a headset or helmet (e.g., VR or $A_R$ goggles), sitting down on a seat (e.g., an airline passenger seat, a train seat, a restaurant both or chair). Also, the AI device 100 can include one or more sensors for detecting the initiation event.

According to an embodiment, after the initiation event is detected, the AI device 100 can output a message to the user confirming whether or not the user wants to proceed with receiving recommendations (e.g., a message can be displayed or output via audio, such as a synthesized voice). In response to receiving user confirmation, the AI device 100 can proceed with providing recommendations to the user.

In the situation shown in FIG. 10, a recipe recommendation system is used as an example. However, the recommendation system can provide recommendations according to other scenarios, such as providing recommendations for movies, advertisements, books, products, etc.

FIG. 11 shows an example of using the review-based recommender (RRS) of the recommender. For instance, the review-based recommender (RRS) captures the user's query and generating an embedding representation (e.g., $z_q$) from it (Step 1). In the MPNet-based recommendation, the query embedding (e.g., $z_q$) is compared with the NLP embeddings of all reviews available in the system. Recipes are then ranked based on the degree of similarity between the query and their corresponding reviews (Step 2).

Further in this example, for KGE-based recommendations, the query embedding is aligned with the KGE space. This alignment is facilitated by a pre-trained autoencoder, which translates NLP embeddings into their equivalent KG embeddings (Step 3). Once the aligned query embedding is generated, it is utilized in predicting the connections between reviews and recipes (Step 4). KGE-based recommendations then rank recipes according to their link prediction probabilities. Finally, the Aggregator merges the rankings generated by both MPNet and KGE systems to produce the final recipe recommendations (Step 5).

According to an embodiment, the review-based recommender can provide a final ranking for each recipe by averaging the individual ranking positions assigned by each recommender. For example, the final ranking of each recipe can be calculated as the average of its individual rankings from both systems and the top recommendation results can be provided to the user (e.g., a top 10 list), but embodiments are not limited there to.

FIG. 12 shows an example of using the image-based recommender (IRS) of the recommender. For instance, to discover recipes that are similar to or the same as a specific dish, the user uploads an image of food (e.g., input image). This image is then processed by the KG-VAE model, where its encoder generates an embedding representation capturing its key features or latent features (Step 1). This embedding representation is then compared to the existing image representations of other recipes to measure their visual similarity (Step 2). Finally, based on these similarity scores, the top K recipes with the closest visual resemblance are recommended to the user (e.g., the top 10 results are displayed).

Various embodiments of the AI device 100 implementing the recommender discussed above involve recommending recipes to a user. However, the AI device 100 is not limited to recommending recipes. For example, the AI device 100 implementing the recommender can be used to recommend various types of items, such as movies, products, clothes, videos, webpages, flights, vacation packages, routes, etc. According to an embodiment, the AI device can be configured to recommend home appliance devices, mobile electronic devices or display devices to a user. The AI device 100 can be used in various types of different situations.

Regarding self-driving vehicles or robots, the recommender device can be used to suggest a specific route, path or commute to a user from among a plurality of routes or paths, and provide more tailored recommendations during later sessions. Also, the recommender device can be integrated or combined with an infotainment system of a self-driving vehicle to provide recommendations.

According to one or more embodiments of the present disclosure, a recommender can solve one or more technological problems in the existing technology, such as providing improved performance for recommendations while being able to handle multiple modalities and multiple purposes.

Various aspects of the embodiments described herein can be implemented in a computer-readable medium using, for example, software, hardware, or some combination thereof. For example, the embodiments described herein can be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions can be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

Furthermore, although some aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, Perl, PHP, HTML, or other programming languages. One or more of such software sections or modules can be integrated into a computer system, computer-readable media, or existing communications software.

Although the present disclosure has been described in detail with reference to the representative embodiments, it will be apparent that a person having ordinary skill in the art can carry out various deformations and modifications for the embodiments described as above within the scope without departing from the present disclosure. Therefore, the scope of the present disclosure should not be limited to the aforementioned embodiments, and should be determined by all deformations or modifications derived from the following claims and the equivalent thereof.

What is claimed is:

1. A method for controlling an artificial intelligence (AI) device, the method comprising:
   receiving, via a processor in the AI device, a request for a recommendation;
   determining, via the processor, a selected recommender from among a behavior-based recommender, a review-based recommender and an image-based recommender based on at least one of a modality of the request, a format of the request and a content of the request;
   generating, via the processor and using the selected recommender, a query embedding from the request;
   aligning, via the processor, the query embedding with at least one knowledge graph embedding space to generate an aligned embedding;
   generating, via the processor, recommendation results by identifying items within the at least one knowledge graph embedding space based on a proximity of item embeddings to the aligned embedding; and
   outputting, via an output unit in the AI device, the recommendation results.

2. The method of claim 1, wherein the recommendation results include a ranked list of items.

3. The method of claim 1, wherein the recommendation results include at least one of a food recipe recommendation, a book recommendation, a movie recommendation, a product recommendation, a video recommendation, a news content recommendation, or an advertisement recommendation.

4. The method of claim 1, further comprising:
   in response to a trigger event occurring, generating the request based on the trigger event;
   transmitting the request to the behavior-based recommender;
   adding a placeholder node to a knowledge graph, the placeholder node corresponding to a user associated with the trigger event;
   generating a natural language processing (NLP) embedding representation based on user information associated with the user;
   aligning the NLP embedding representation to a knowledge graph embedding associated with the behavior-based recommender to generate an aligned embedding;
   assigning the aligned embedding to a node corresponding to the user; and
   generating the recommendation results based on the node via link prediction.

5. The method of claim 1, further comprising:
   in response to a trigger event occurring, generating the request based on the trigger event;
   transmitting the request to the behavior-based recommender;
   generating a node corresponding to the user;
   decoupling the node to generate a first node and a second node, the first node corresponding to a first node cluster and the second node corresponding to a second node cluster; and
   generating the recommendation results for the user based on the first node and the second node via link prediction.

6. The method of claim 5, wherein the first node cluster corresponds to a first group of recipes for a first type of cuisine, and
   wherein the second node cluster corresponds to a second group of recipes for a second type of cuisine different than the first type of cuisine.

7. The method of claim 1, further comprising:
   in response to the request including a textual query, transmitting the request to the review-based recommender;
   generating a natural language processing (NLP) embedding representation based on the textual query;
   aligning the NLP embedding with knowledge graph embeddings of reviews to generate an aligned representation for the textual query; and
   generating the recommendation results for the user based on the aligned representation via link prediction.

8. The method of claim 7, wherein the recommendation results are hybrid results based on first recommendation results generated based on a knowledge graph embedding model and second recommendation results generated based on a pre-trained natural language processing (NLP) embedding model.

9. The method of claim 1, further comprising:
   in response to the request including an image, transmitting the request to the image-based recommender;
   during training, guiding a variational autoencoder based on a knowledge graph embedding space to learn a distribution of images;
   comparing an encoded representation of the image to representations of images corresponding to the distribution of images to determine similar images that are similar to the image in the request; and
   generating the recommendation results based on the similar images.

10. The method of claim 9, wherein the guiding of the variational autoencoder includes biasing or forcing images from a similar category or similar family to be closer to one another.

11. The method of claim 1, wherein the AI device includes at least one of a smart television, a mobile phone, and a home appliance device.

12. An artificial intelligence (AI) device for providing recommendations, the AI device comprising:
   a memory configured to store item information; and
   a controller configured to:
   receive a request for a recommendation,
   determine a selected recommender from among a behavior-based recommender, a review-based recommender and an image-based recommender based on at least one of a modality of the request, a format of the request and a content of the request, generate, using the selected recommender, a query embedding from the request, align the query embedding with at least one knowledge graph embedding space to generate an aligned embedding, generate recommendation results by identifying items within the at least one knowledge graph embedding space based on a proximity of item embeddings to the aligned embedding, and output the recommendation results.

13. The AI device of claim 12, wherein the recommendation results include a ranked list of items.

14. The AI device of claim 12, wherein the controller is further configured to:

in response to a trigger event occurring, generate the request based on the trigger event, input the request to the behavior-based recommender, add a placeholder node to a knowledge graph, the placeholder node corresponding to a user associated with the trigger event, generate a natural language processing (NLP) embedding representation based on user information associated with the user, align the NLP embedding representation to a knowledge graph embedding associated with the behavior-based recommender to generate an aligned embedding, assign the aligned embedding to a node corresponding to the user, and generate the recommendation results based on the node via link prediction.

15. The AI device of claim 12, wherein the controller is further configured to:

in response to a trigger event occurring, generate the request based on the trigger event, input the request to the behavior-based recommender, generate a node corresponding to the user, decouple the node to generate a first node and a second node, the first node corresponding to a first node cluster and the second node corresponding to a second node cluster, and generate the recommendation results for the user based on the first node and the second node via link prediction.

16. The AI device of claim 15, wherein the first node cluster corresponds to a first group of recipes for a first type of cuisine, and wherein the second node cluster corresponds to a second group of recipes for a second type of cuisine different than the first type of cuisine.

17. The AI device of claim 12, wherein the controller is further configured to:

in response to the request including a textual query, input the request to the review-based recommender, generate a natural language processing (NLP) embedding representation based on the textual query, align the NLP embedding with knowledge graph embeddings of reviews to generate an aligned representation for the textual query, and generate the recommendation results for the user based on the aligned representation via link prediction.

18. The AI device of claim 17, wherein the recommendation results are hybrid results based on first recommendation results generated based on a knowledge graph embedding model and second recommendation results generated based on a pre-trained natural language processing (NLP) embedding model.

19. The AI device of claim 12, wherein the controller is further configured to:

in response to the request including an image, input the request to the image-based recommender, during training, guide a variational autoencoder based on a knowledge graph embedding space to learn a distribution of images, compare an encoded representation of the image to representations of images corresponding to the distribution of images to determine similar images that are similar to the image in the request, and generate the recommendation results based on the similar images.

20. The AI device of claim 19, wherein the guiding of the variational autoencoder includes biasing or forcing images from a similar category or similar family to be closer to one another.

* * * * *